United States Patent
Dai et al.

(10) Patent No.: US 12,254,192 B2
(45) Date of Patent: Mar. 18, 2025

(54) FILE ENCRYPTION LAYER

(71) Applicant: Zoom Communications, Inc., San Jose, CA (US)

(72) Inventors: Yongxiang Dai, HeFei (CN); Shaohua Li, HeFei (CN); Lin Sun, HeFei (CN)

(73) Assignee: Zoom Communications, Inc., San Jose, CA (US)

( * ) Notice: Subject to any disclaimer, the term of this patent is extended or adjusted under 35 U.S.C. 154(b) by 136 days.

(21) Appl. No.: 17/588,309

(22) Filed: Jan. 30, 2022

(65) Prior Publication Data
US 2023/0244389 A1     Aug. 3, 2023

(51) Int. Cl.
*G06F 3/06*     (2006.01)
*G06F 21/60*     (2013.01)
*G06F 21/78*     (2013.01)

(52) U.S. Cl.
CPC ............ *G06F 3/0622* (2013.01); *G06F 3/064* (2013.01); *G06F 3/0659* (2013.01); *G06F 3/067* (2013.01); *G06F 21/602* (2013.01); *G06F 21/78* (2013.01)

(58) Field of Classification Search
None
See application file for complete search history.

(56) References Cited

U.S. PATENT DOCUMENTS

| | | | | |
|---|---|---|---|---|
| 7,913,092 | B1 * | 3/2011 | Hiltunen | G06F 21/54 726/1 |
| 2002/0152230 | A1 * | 10/2002 | Gusler | G06F 11/2069 |
| 2004/0202322 | A1 * | 10/2004 | Chavanne | H04L 9/0637 380/43 |
| 2005/0256843 | A1 * | 11/2005 | Santos | G06F 16/1767 |
| 2006/0253858 | A1 * | 11/2006 | Rochette | G06F 9/44521 719/319 |
| 2010/0011447 | A1 * | 1/2010 | Jothimani | G06F 21/6209 726/27 |
| 2010/0310057 | A1 * | 12/2010 | Theppasandra | H04M 3/548 379/88.04 |
| 2014/0173700 | A1 * | 6/2014 | Awan | H04W 12/02 726/4 |
| 2014/0215210 | A1 * | 7/2014 | Wang | H04L 63/0428 713/165 |
| 2015/0222637 | A1 * | 8/2015 | Hung | H04L 63/0272 726/1 |

(Continued)

OTHER PUBLICATIONS

Analysis of Encryption Technology Development of Encryption Software, https://titanwolf.org/Network/Articles/Article?AID=e0fe02d0-2100-rb92-a0c5-940eb7c53763, Jan. 6, 2022, 18 pages.

(Continued)

*Primary Examiner* — Kevin L Young
*Assistant Examiner* — Phuong N Hoang
(74) *Attorney, Agent, or Firm* — Young Basile Hanlon & MacFarlane, P.C.

(57) ABSTRACT

Communications service programs (e.g., packet-switched phone and conferencing software with recordings and voice-mail) are enabled to process user data files using custom encryption methods, where the existing service programs should migrate to work with the encrypted data files. A framework is introduced between application and system layer for replacing the major file routines to apply user file encryption routines in a manner that is transparent for existing service programs without requiring re-compiling.

20 Claims, 11 Drawing Sheets

(56) References Cited

U.S. PATENT DOCUMENTS

2016/0335110 A1* 11/2016 Paithane ............. G06F 9/45558
2019/0081990 A1*  3/2019 Roy ..................... H04L 9/0891
2020/0319944 A1* 10/2020 Bhat ..................... G06F 3/061

OTHER PUBLICATIONS

Encrypting File System, Wikipedia, https://en.wikipedia.org/wiki/Encrypting_File_System, Dec. 5, 2021, 9 pages.
Hooking, Wikipedia, https://en.wikipedia.org/wiki/Hooking, Jan. 6, 2022, 10 pages.
Selecting the Right Encryption Approach for your Organization, Thales, Jan. 2022, 3 pages.
File Encryption Driver Development with per Process Access Restriction, Apriorit, https://www.apriorit.com/dev-blog/371-file-encryption-driver-development-with-per-process-access-restriction, Apr. 1, 2016, 22 pages.
Design and Implementation of Encrypted and Decrypted File System Based on USBKey and Hardware Code, API Conference Proceedings 1839, Kehe Wu, Yakun Zhang, Wenchao Cui, et al., https://doi.org/10.1063/1.4982580, May 8, 2017, 9 pages.
What is File Encryption? Box Blogs, https://blog.box.com/what-is-file-encryption, Oct. 28, 2021, 13 pages.

* cited by examiner

FILE ENCRYPTION LAYER

FIELD

This disclosure generally relates to file-level encryption in software platforms, and more specifically, to implementations of a file encryption layer.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
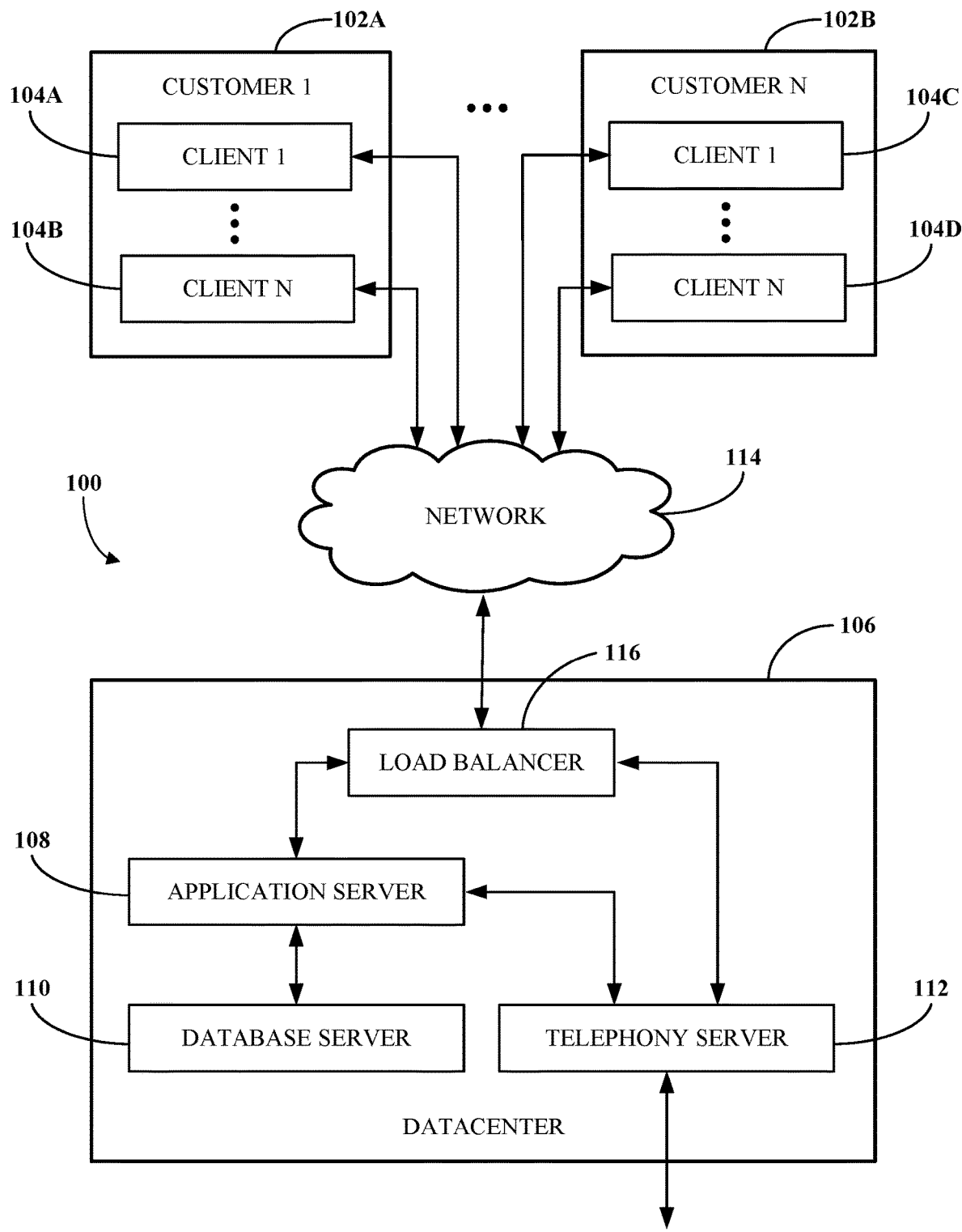
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Service programs in a software platform user space, such as a UCaaS platform user space, normally process data files with data stored in a plaintext format. The common routines for file processing typically include many operation sequences, such as to open a file to get a handle (e.g., a pointer or other identifier for a file data structure managed by an operating system), read data with file handle, or write data with file handle. Security concerns may arise in a computing system where user data (e.g., voicemail, e-mails, or conference recordings) is stored in a plaintext (i.e., not encrypted) format that is vulnerable to access by unintended users, which may include malicious hackers. To address security concerns, the data files should be encrypted with custom encryption methods, and the existing service programs (e.g., phone, virtual meeting, and voicemail applications) should migrate to work with the encrypted data files. However, conventional solutions for file encryption within a UCaaS platform often require re-compiling applications and/or operating systems to use particular encryption technologies, and thus the rollout of such a feature can itself consume computing resources and create risk of system downtime.

Implementations of this disclosure address problems such as these by introducing a framework between an application layer and system/operating system layer for replacing major file routines to apply file encryption routines, which may be customized for particular users. This new file encryption layer may be transparent for existing service programs without requiring re-compiling. By avoiding modification of source code for service programs and re-building, system downtime may be mitigated. The file encryption layer may establish a list of open encrypted files, which may be called a crypto cache list. Files in the list may be encrypted and decrypted one block at a time with plaintext stored in a temporary buffer or sandbox of the encryption layer. Entries in the list may be indexed by file descriptor and may include encryption information, such as a dynamically generated encryption key. The crypto cache list may be used to support parallel processing and controlling the number of file access calls being parallel processed.

Some implementations may address the problem of providing file level encryption by implementing a transparent encryption layer for file routines. In the encryption layer, files processed during reading/writing can be protected from pilferage by an attacker reading the plaintext data in a file system without a required system privilege level.

An encryption layer may be transparent in the sense that access to files by applications is conducted by the applications in the same manner as in other contexts. However, the actual processing of the content in conjunction with file management operations by the applications may be performed in a location that is not known to the application.

In some embodiments, file input/output (I/O) related system calls are intercepted using a technique called hooking. "Hooking" refers to the process of gaining control of an application whenever it makes system calls of particular interest. Once an application is hooked, file I/O related system calls that involve data destined for a protected network can be redirected. The data may be encrypted and stored in a local file system.

For example, if the Microsoft® Windows® operation system is used, hooking can be achieved by creating a remove thread in the application to be hooked. Instruction pointer addresses for the system calls to be hooked may be modified to point to desired thin client functions.

For hooking Linux® or Apple® iOS® applications, the desired applications may be started in a SHELL environment where the LD PRELOAD variable is set to the thin encryption layer so that system calls of interest are overridden, and control is taken away from the application making the system call when the library is invoked by the application.

For example, an encryption layer may be made operational by hooking file management related system calls, such as open, create (e.g., in case of Linux® and Apple® iOS® software applications), and CreateFile (e.g., for Windows® operating system applications), among others. Once the system call is hooked, the file path may be rewritten to point to an administrator-configured encryption layer. Thus, instead of operating on a file in a location that is known to the application, operations may be directed to content in the encryption layer that has encryption/decryption unknown to the application.

In order to record the information of files to be used by the encryption layer, an encrypted file may include a header with fields that store encryption related metadata. The header may store encryption information for a file created by an application through the encryption layer, with its content stored inside as encrypted data. In this way the data may be accessible to other applications in use that are configured to use the same encryption parameters. In some embodiments, an encryption header data store can be set up to maintain a record for each file stored with its header. For example, the following fields may be present in each record:

SIGN— a sign for the file, indicates that the file is encrypted.

VER— indicates the version of current header.

CipherSuite—a field for identifying an encryption cipher suite, e.g., it may follow the ianan definition.

ChunkSize— the (N+1)*512 bytes.

DATA— the encrypted data stored in file. It may be stored as sequence of blocks of encrypted data.

The sequence of operations used in some embodiments to realize the encryption functionality described herein may begin when an application is hooked with a preselected file encryption layer (e.g., a library) that is designed to intercept file management related system calls (e.g., application calls such as create, open, write, read, close, and delete). Then, the file encryption layer can be invoked whenever an application invokes a call to open a file (e.g., with a write or append flag as parameter), such as using a create or CreateFile command, or some other appropriate system call for obtaining a new file handle.

At this point, the file encryption layer can operate to intercept system file management operation calls. If the requested path points to a file inside the file encryption layer (e.g., a user is attempting to open files), access may be denied by returning an appropriate error code. Otherwise, an encryption header data store may be checked by comparing the application-provided filename and path to the actual path in the data store for files already present in the file encryption layer. If no matching entry is found, then a new file may be created inside the file encryption layer.

To create a new encrypted file, an empty file in the path requested by the application is created. This may serve to maintain transparency of the file encryption layer with respect to a user. Thus, once a file is created by the user, the created file can be accessed at the same location to which it was created. However, the file content is in reality stored inside a sandbox in the file encryption layer, in the form of plaintext data. A sandbox is a chunk of the encrypted file that with file position point, encrypt context, and it support read/write in this chunk-range, can be flushed into the dis.

The creation of the new encrypted file can be initiated by generating a random string to use as initial vector inside the sandbox, generating a crypto graphic key (e.g., using a pseudo-random number generation system) inside the file encryption layer, and inserting a descriptive record into the data store. The file handle that points to the file inside the sandbox may then be returned.

If the system call comprises one of the family of write system calls, and if the file corresponding to a supplied file handle is present in file encryption layer, then data to be written to the file can be encrypted (e.g., using a stream cipher algorithm) by using the key available in the key pool. Similarly, if the system call comprises one of the family of read system calls, and if the file corresponding to a supplied file handle is present in the data store, then the data to be read can be decrypted (e.g., using an appropriate stream cipher algorithm) by using the key available in the key pool.

In response to a remove or delete system call, just transparent referral to the system operating system may be used, i.e., it will rely on system's file functionality.

In response to a system call that comprises one of the family of close system calls, if the file corresponding to file handle is present in the file encryption layer, flush the raw data buffer into data file with encrypting and then close the file.

Embodiments of the invention can therefore be implemented in a variety of architectural platforms, operating and server Systems, devices, systems, or applications. Any particularly architectural layout or implementation presented herein is thus provided for purposes of illustration and comprehension only and is not intended to limit the various embodiments.

Some target functions and file access routines that may be intercepted by a file encryption layer are listed below:

| Function(s) | Comment |
| --- | --- |
| open/open64/CreateFile | open and possibly create a file or device |
| close/CloseHandle | close a file descriptor |
| lseek/lseek64/SetFilePointer | reposition read/write file offset |
| read/ReadFile/ReadFileEx | read from a file descriptor |
| write/WriteFile/WriteFileEx | write to a file descriptor |
| fsync/FlushFileBuffers | synchronize a file's in-core state with storage device |
| ftruncate/ftruncate64/SetEndOfFile | truncate a file to a specified length |
| ___xstat/___xstat64/__stat | get file status by file name |
| ___fxstat/___fxstat64/__fstat | get file status by file descriptor |

For example, a file encryption layer may be used to provide encryption of voicemail stored in the UCaaS system in a manner that is transparent to the existing applications running in the UCaaS system. Other types of data may also be encrypted, such as recordings of virtual conferences. A file encryption layer may support multiple operating systems. A file encryption layer may operate on user devices (e.g., laptops & smartphones). In some implementations, the encryption used by a file encryption layer may be configurable by users.

To describe some implementations in greater detail, reference is first made to examples of hardware and software structures used to implement a file encryption layer. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
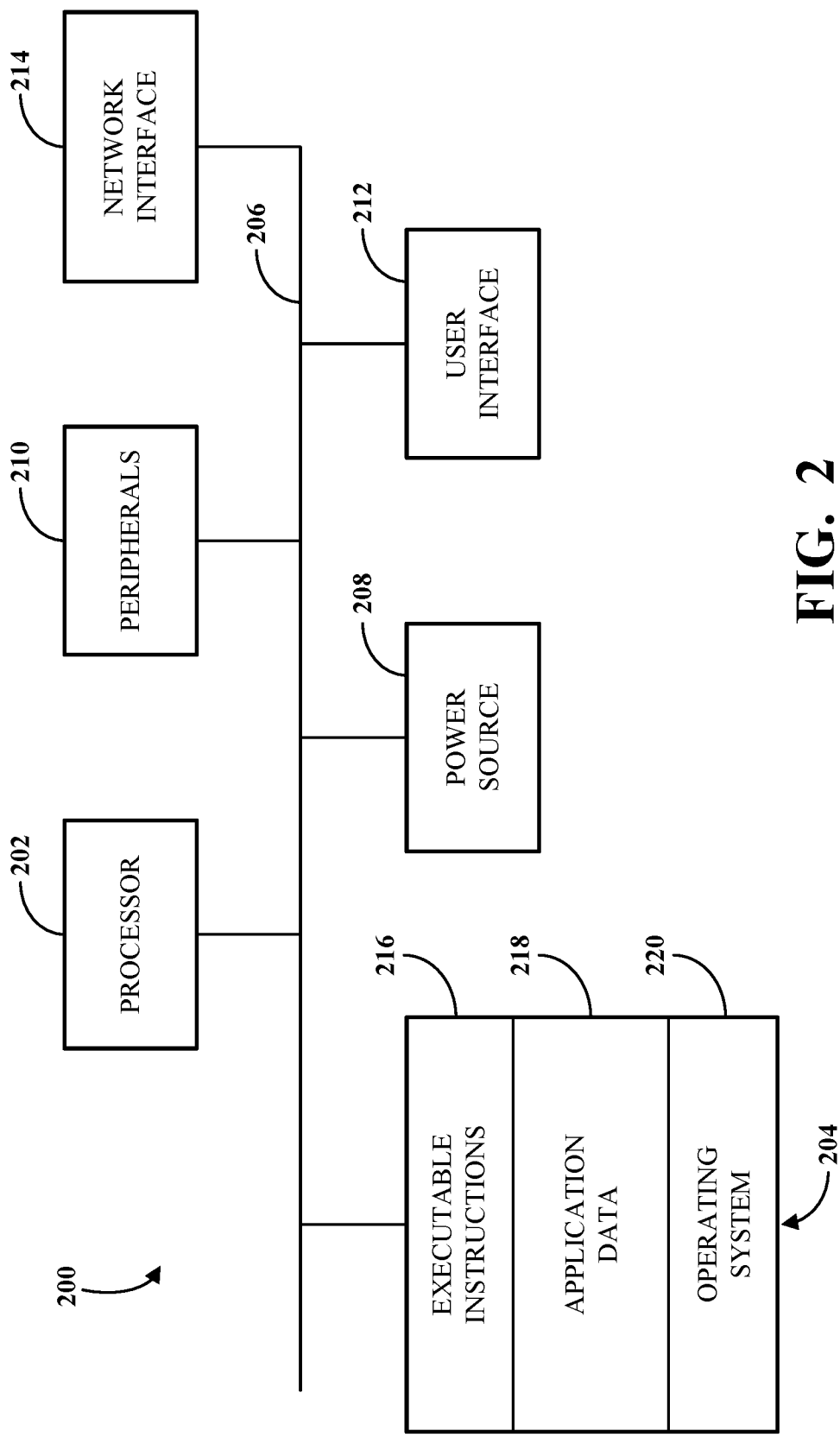
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
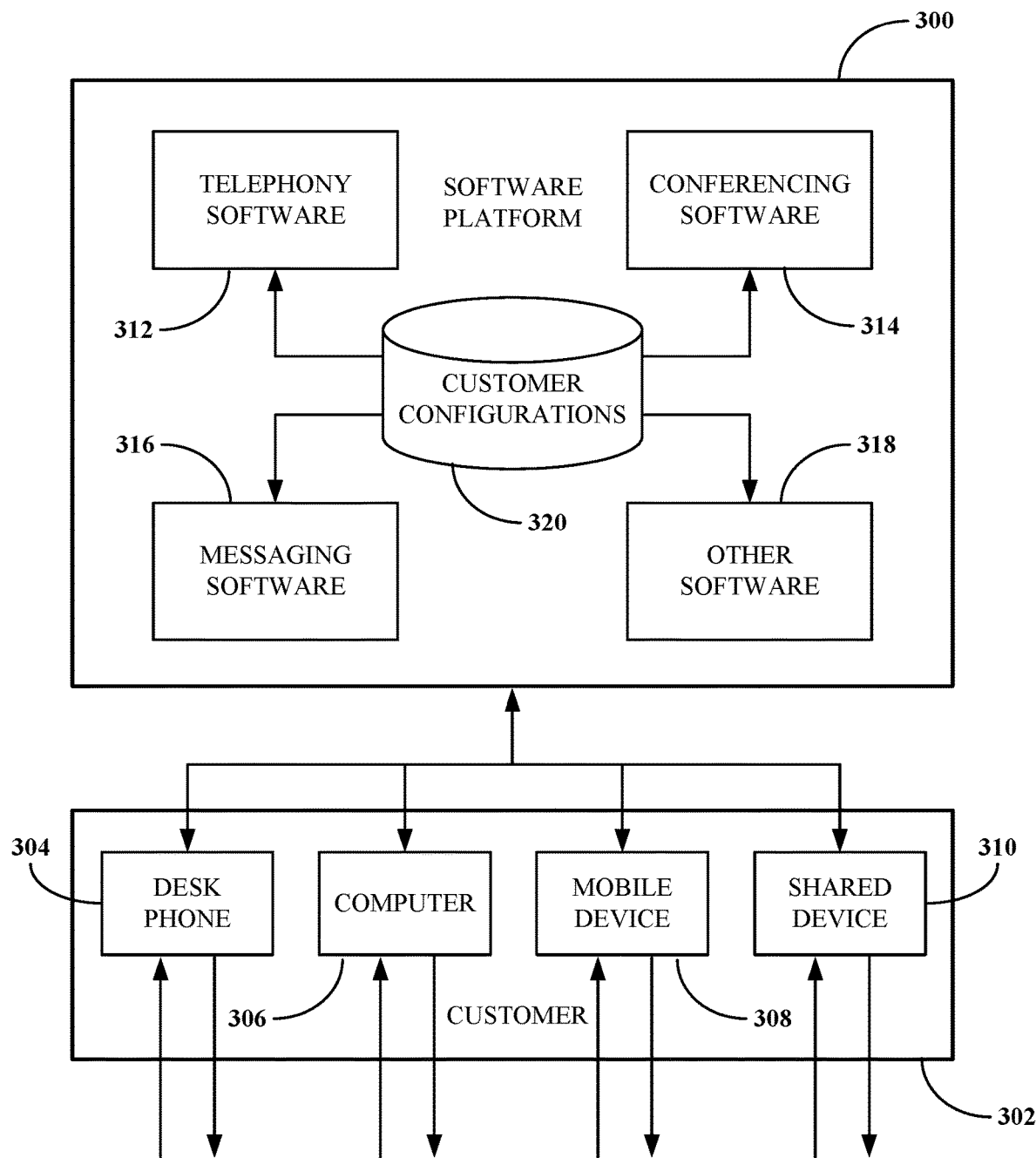
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a file encryption layer that seamlessly enables the use of file encryption applications running in the software platform 300.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figures 4A, 4B:
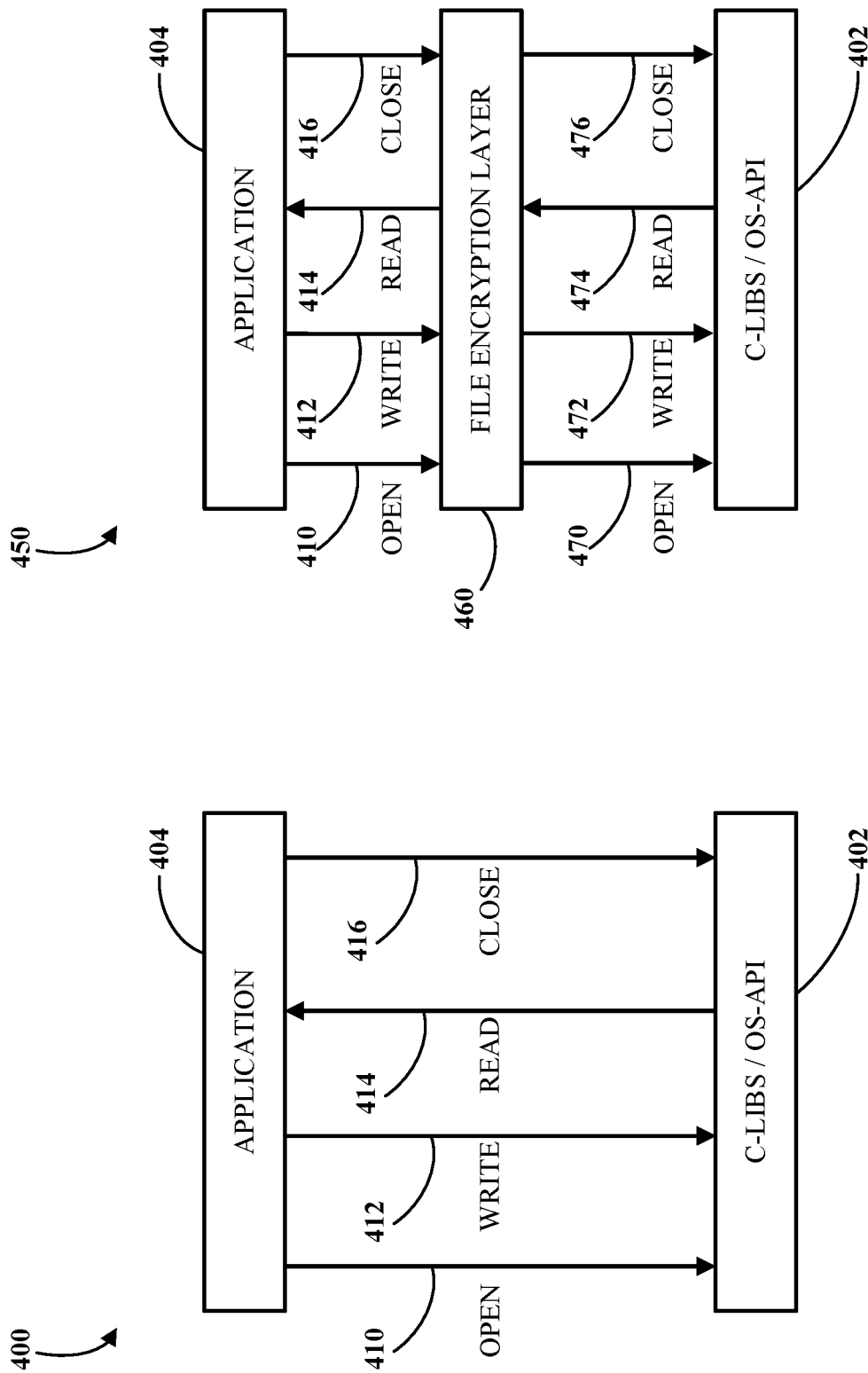
FIG. 4A is a block diagram of an example of a software platform implemented by an electronic computing and communications system that enables file access.
FIG. 4B is a block diagram of an example of a software platform implemented by an electronic computing and communications system that enables file access using an encryption layer.

FIG. 4A is a block diagram of an example of a software platform 400 implemented by an electronic computing and communications system (e.g., the system 100) that enables file access. The software platform 400 uses common file processing routines, including open (e.g., CreateFile), write, read, close, and other file operations are not explicitly shown. For example, a common reading/writing routine for a running program may call file APIs (read/write . . . ) from C-libs or OS.

The software platform 400 includes an application programming interface (API) 402 for an operating system with a library of file access routines (e.g., the C-Lib library). The software platform 400 includes an application 404 that runs on the operating system and makes system calls using the API 402 of the operating system to access files. The system calls illustrated include an open file call 410 that returns a file descriptor (e.g., a file handle) to the application 404, a read file call 412 that returns data from a file identified by a file descriptor to the application 404, a write file call 414 that stores data from the application 404 in a file identified by a file descriptor, and a close file call 416 that closes a file identified by a file descriptor.

The software platform 400 of FIG. 4A does not include support for file-level encryption without modification of the application 404 and/or the API 402 of the operating system. Modification of the source code and re-compiling many parts of software platform to implement a consistent file-level encryption scheme may be risky and may increase system downtime.

FIG. 4B is a block diagram of an example of a software platform 450 implemented by an electronic computing and communications system (e.g., the system 100) that enables file access using an encryption layer. The architecture of the software platform 450, which may, for example, be part of the software platform 300 shown in FIG. 3, runs a file encryption layer 460 between the application 404 and the API 402 of an operating system that includes a library of file access routines (e.g., C-Lib). The file encryption layer 460 may transparently enable the application 404 to open/read/ write encrypted files stored by the operating system. For example, the file encryption layer 460 may be configured to intercept file access system calls from the application 404 to the API 402 of the operating system using an inter-process signal intercept technique, such as hooking.

In the software platform 450, the file encryption layer 460 is configured to intercept the system calls (410, 412, 414, and 416) from the application 404 to the API 402 of the operating system, and convert them into modified system calls (470, 472, 474, and 476) for access data in an encrypted file. The system calls illustrated include an open file call 410 (e.g., CreateFile) from the application 404 that is intercepted by the file encryption layer 460 and converted into the open file call 470 that opens an encrypted file and returns a file descriptor for this encrypted file that is managed in a list of open encrypted files maintained by the file encryption layer 460. For example, the file encryption layer 460 may check whether the file to be opened is exists or not. If the file already exists in and encrypted format (e.g., the encrypted file format illustrated in FIG. 8), then the file encryption layer 460 may open the file and initialize the encryption parameters (e.g., determining an encryption key and an encryption protocol) for use in encrypting and/or decrypting data flowing in and out of the encrypted file. The system calls illustrated include a read file call 412 from the application 404 that is intercepted by the file encryption layer 460 and converted into the read file call 472 that returns encrypted data from an encrypted file to the file encryption layer 460. The file encryption layer 460 then decrypts the encrypted data and returns the resulting plaintext data to the application 404 in response to the read file call 412. The system calls illustrated include a write file call 414 from the application 404 that is intercepted by the file encryption layer 460 and converted into the write file call 474. The file encryption layer 460 encrypts data from the write file call 414 and stores resulting encrypted data in an encrypted file using the write file call 474. The system calls illustrated include a close file call 416 from the application 404 that is intercepted by the file encryption layer 460 and converted into the close file call 476 that closes an encrypted file.

Figure 5:
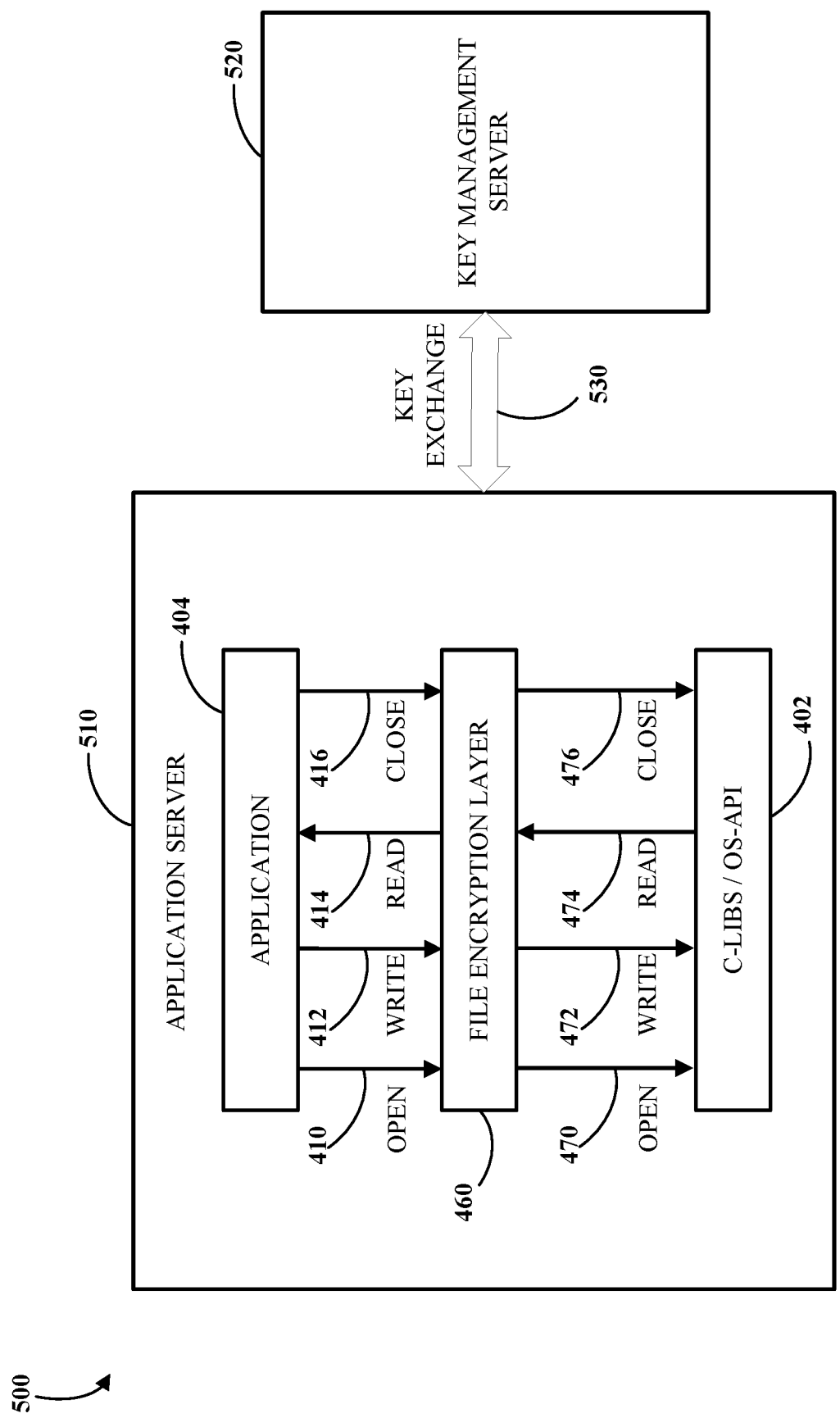
FIG. 5 is a block diagram of an example of a system that enables file access using an encryption layer and a key management server.

FIG. 5 is a block diagram of an example of a system 500 that enables file access using an encryption layer and a key management server. The system 500 may include an extended architecture for file-encryption work using an application server 510 that runs the software platform 450 of FIG. 4B and a key management server 520 for dynamic generation and distribution of encryption keys. The system 500 may support remote key manager management. For example, when opening an encrypted file, the file encryption layer 460 may be configured to invoke a key exchange 530 with the key management server 520 to obtain and encryption key to be used for data stored in an encrypted file being opened. In some implementations, the key exchange 530 may include receiving a request to establish a communications link between the file encryption layer 460 and the key management server 520. For example, secure file processing may include of establishing a link between the file encryption layer 460 and the key management server 520 with secure network layer (e.g., SSL). Another way to initiate secure file processing is programmatically. For example, the file encryption layer 460 between the application 404 and the API 402 of the operating system/C-Lib may operate to expose initialized environment variables.

In an example, the open file call 410 may be blocked by the key exchange 530 with establishing a communications link as part of file encryption layer 460 processing in response to receiving a response to the open file call 470. In some implementations, the communications link established may an integral part of a function of the file encryption layer 460. The key exchange 530 may block operation related to other system calls (e.g., 412, 414, and 416) upon receiving a file management operation request.

Application file management operations that attempt direct access to the file content on file system may be rejected. So, if it is determined that the file management operation includes a path that points directly to the file encryption layer 460, then open file call 410 may be rejected by the file encryption layer 460 and execution returned the application 404 to receive another file management operation request. If the file management operation requested is in order, then the open file call 410 may result in access to content of an encrypted file via the open file call 470 to the API 402 of the operating system with encrypted information associated with the file content using a data store across applications. This activity may include accessing the data store using information associated with the file management operation to locate the file content in the file encryption layer 460. Thus, in some implementations, the open file call 410 may continue, in the file encryption layer 460, with transparently redirecting the file management operation associated with applications running over the file encryption layer 460 to file content associated with the files, where the file content is located in the file system that is inaccessible to the applications. Transparent redirection may include executing the file management operation on the file content, wherein the file management operation (e.g., 410, 412, 414, or 416) is associated with a requested path pointing to at least one empty file included in the files.

Figure 6:
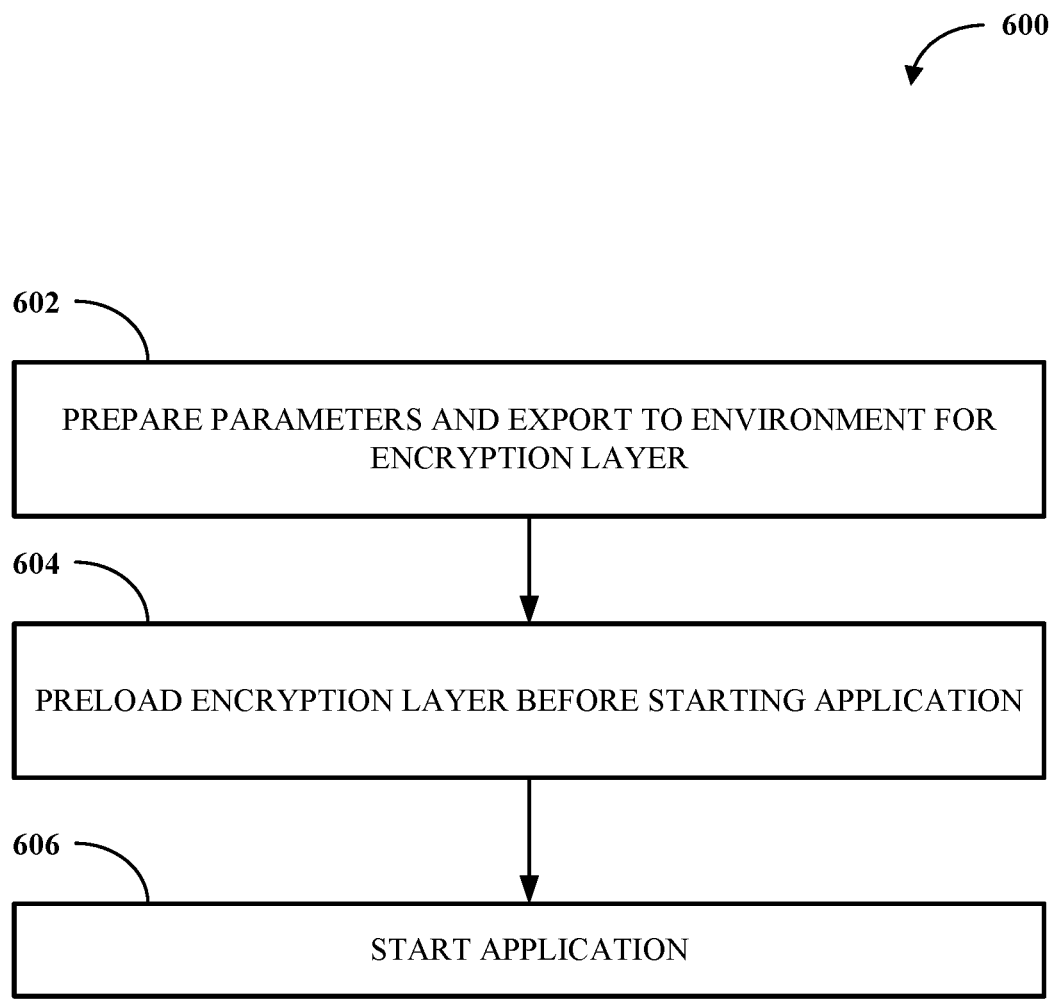
FIG. 6 is a flowchart of an example of a technique for initializing an encryption module.

FIG. 6 is a flowchart of an example of a technique 600 for initializing an encryption module. The technique 600 can be executed using computing devices, such as the systems, hardware, and software described with respect to FIGS. 1-5. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

For example, the technique 600 may be a sequence for preparing a software environment with file encryption layer parameters and initializing the file encryption layer.

At 602, the technique 600 includes preparing parameters and exporting the parameters to the software environment (e.g., a shell of an operating system) for the file encryption layer. For example, the parameters may be prepared for the file encryption layer and exported to an environment for subprocesses (e.g., for inter-process communication).

At 604, the technique 600 includes preloading the file encryption layer before starting an application (e.g., the application 404). At 606, the technique 600 includes starting the application. For example, in a Windows® system, the technique 600 may include starting the subprocess as suspend and injecting the file encryption layer by a remote thread and passing the environment variable by allocating and writing to the remote memory of a subprocess.

In some implementations, a system call for securely processing files should check whether the file encryption layer is initialized or not before executing. Such a system call could support multiple threads calling (e.g., using a mutex block) in the initialization routines.

Figure 7:
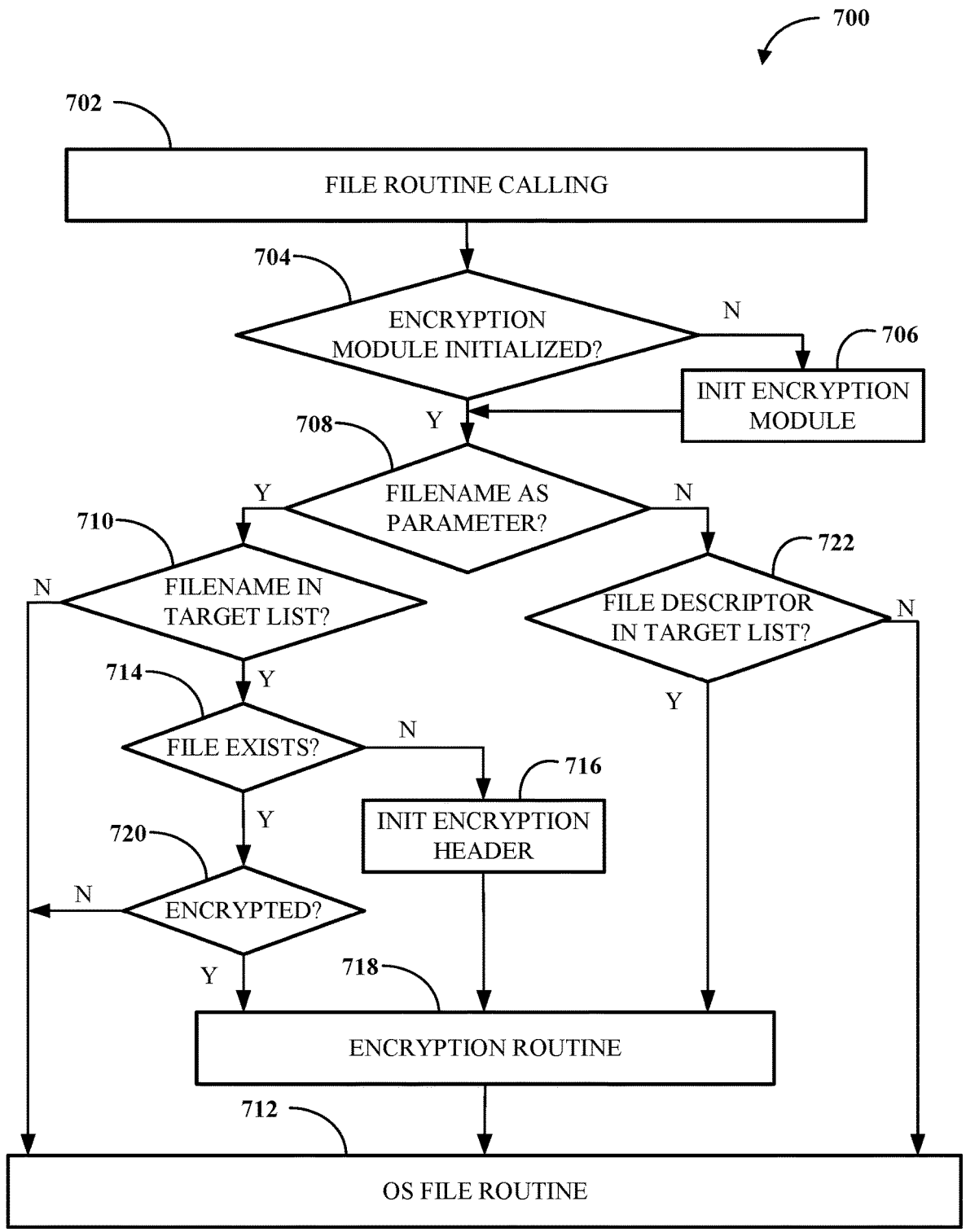
FIG. 7 is a flowchart of an example of a technique for accessing files via a file encryption layer.

FIG. 7 is a flowchart of an example of a technique 700 for accessing files via a file encryption layer. The technique 700 can be executed using computing devices, such as the systems, hardware, and software described with respect to FIGS. 1-5. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The technique 700 may checks the parameters of an encryption module and perform initialization. At 702, the technique 700 includes receiving a file access call that has arrived from an application. At 704, a check is performed to determine if an encryption module (e.g., the file encrypt layer 460) has been initialized. If not, the application file operation calling should be blocked and wait for the file encryption module initialization to finish. At 706, the encryption module is initialized. For example, the technique 600 of FIG. 6 may be implemented to initialize the encryption module. When the encryption module has been initialized, at 708, a check is performed to determine whether the received file access routine call includes a filename as a parameter. If so, at 710, a check is performed to determine if the filename of the file access routine call and/or an associated path appear in a target list that has been designated for file level encryption. If not, at 712, the file access routine call is passed to the underlying operating system for processing of the requested file routine without encryption. If the filename is in the target list, at 714, then a check is performed to determine whether a file with this filename already exists. If not, at 716, a header for a new encrypted file is initialized/created, where the header indicates that it is an encrypted file and encodes some encryption parameters. For example, the header may be in the format illustrated in FIG. 8.

At 718, the header may be passed to an encryption routine of a file encryption layer, which in turn may generate a corresponding system call to the underlying operating system to open a new encrypted file with the header. If a file with the filename does exist already, at 720, a check is performed to determine whether the file with this filename is encrypted. If it is not encrypted, at 712, the file access routine call is passed to the underlying operating system for processing of the requested file routine without encryption. If the file with this filename is encrypted, at 718, the file access routine call is passed to an encryption routine of a file encryption layer, which in turn may, at 712 generate a corresponding system call to the underlying operating system to open the encrypted file associated with the filename. If the received file access routine call includes a filename as a parameter, at 722, a file descriptor of the file access routine call is checked to determine whether it is in a target list of open encrypted files maintained by the file encryption layer. If not, at 712, the file access routine call is passed to the underlying operating system for processing of the requested file routine without encryption. If the file descriptor is in the target list, at 718, the file access routine call is passed to an encryption routine of a file encryption layer, which in turn may, at 712 generate a corresponding system call to the underlying operating system to access the open encrypted file associated with the file descriptor.

Figure 8:
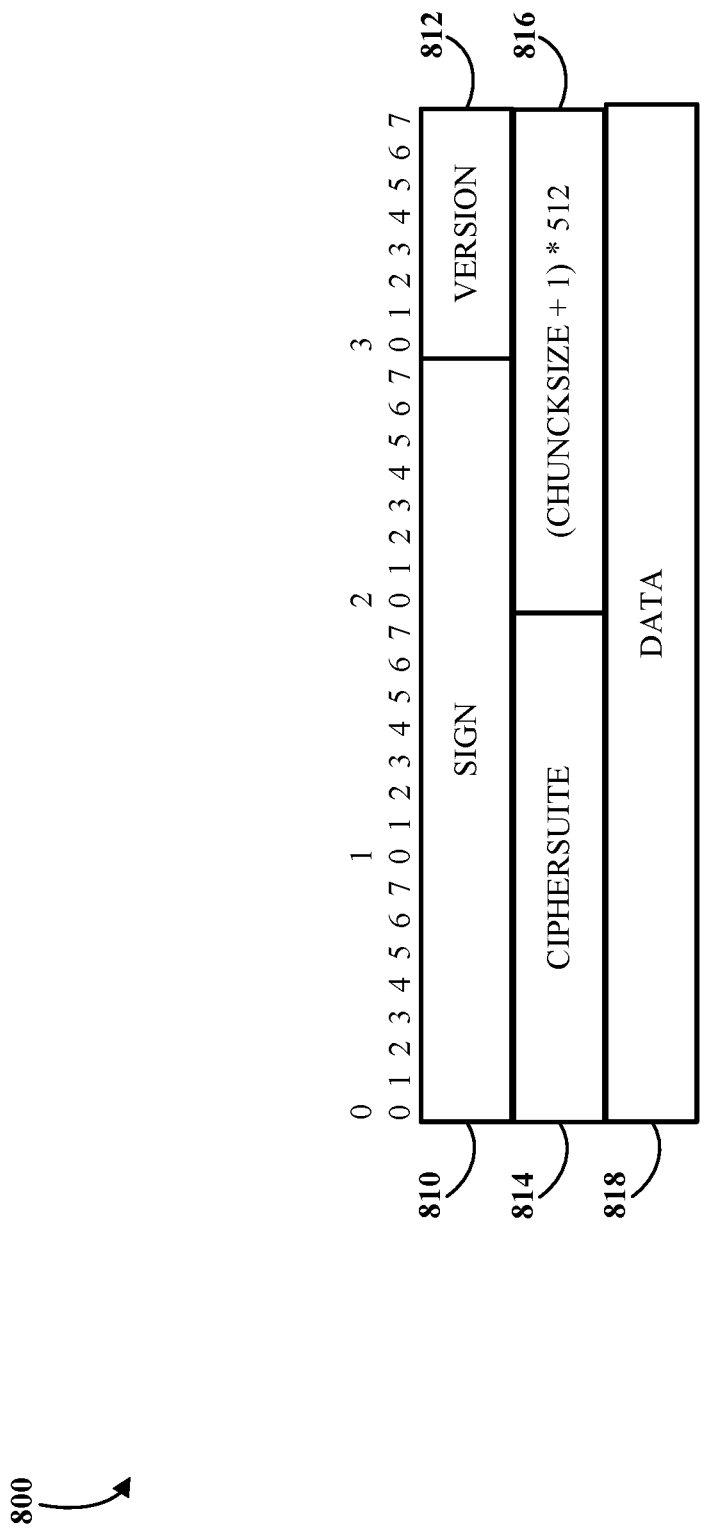
FIG. 8 is a memory map of an example of an encrypted file with a header.

FIG. 8 is a memory map of an example of an encrypted file 800 with a header. The file header for an encrypted file may identify its content. The header for the encrypted file 800 includes a sign field 810 that indicates the file is encrypted. For example, the format of the sign field may be determined by standard implemented by the underlying operating system. The header for the encrypted file 800 includes a version field 812 that indicates a current version of the file/header format. The header for the encrypted file 800 includes a cipher suite field 814 that identifies an applicable encryption cipher suite for the file 800. For example, the cipher suite may follow the ianan definition. The header for the encrypted file 800 includes a chunk size field 816 that indicates the block size for encrypted data in the file 800. The chunk size field 816 may be an integer N, where the encryption block size for the file 800 is (N+1)*512 bytes, e.g., 0 for 512 bytes, 0xFF for 32 k. The encrypted file 800 includes data 818 that includes a sequence of blocks of encrypted data.

Figure 9:
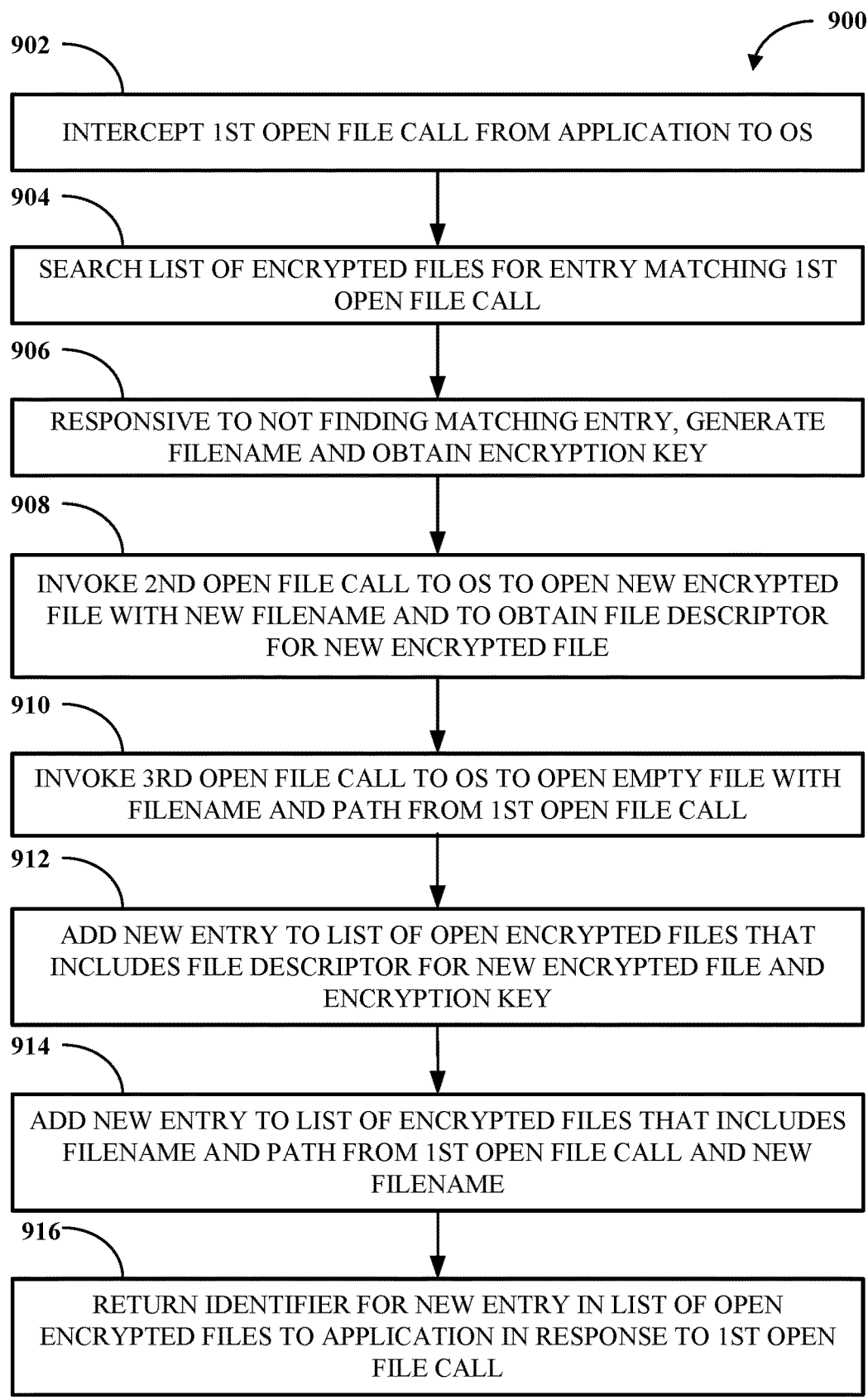
FIG. 9 is a flowchart of an example of a technique for opening a file using a file encryption layer.

To further describe some implementations in greater detail, reference is next made to examples of techniques which may be performed by or using a file encryption layer. FIG. 9 is a flowchart of an example of a technique 900 for opening a file using a file encryption layer. The technique 900 can be executed using computing devices, such as the systems, hardware, and software described with respect to FIGS. 1-5. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, the technique 900 includes intercepting a first open file call from an application to an operating system. For example, intercepting the first open file call may include hooking the first open file call. For example, the technique 600 of FIG. 6 may be used to initialize a file encryption layer and set environment parameters to establish hooking of relevant system calls from the application.

At 904, the technique 900 includes searching a list of encrypted files for an entry matching the first open file call. The file encryption layer may maintain a list of encrypted files to which the file encryption layer controls access. The first open file call may include a filename and/or a path for a file to be opened. Entries in the list of encrypted files may include a respective application facing name associated with an encrypted file maintained by the file encryption layer. The filename and/or a path from the first open file call may be compared to the application facing filenames of entries in the list in encrypted. If a match is found, then the first open file call may be taken to refer to the encrypted file corresponding the matching entry in the list of encrypted files. The matching entry may also include a filename for the encrypted file that is used to store the encrypted file in an underlying operating system. If this existing encrypted file is not already open, a second file open call with may be invoked with this filename of the entry to open the existing encrypted file and add it to a list of open encrypted files maintained by the file encryption layer. If no match is found in the list of encrypted files, then a new encrypted file may be created by the file encryption layer and opened.

At 906, the technique 900 includes, responsive to not finding a matching entry of the list of encrypted files, generating a new filename and obtaining an encryption key. In some implementations, the new filename is generated randomly (e.g., using a true random number generator or a pseudo random number generator). For example, the encryption key may be generated locally or requested from a key management server (e.g., the key management server 520).

At 908, the technique 900 includes invoking a second open file call to the operating system to open a new encrypted file with the new filename and to obtain a file descriptor (e.g., a file handle) for the new encrypted file. For example, invoking the second open file call may include executing the second open file call.

At 910, the technique 900 includes invoking a third open file call to the operating system to open an empty file with the filename and the path from the first open file call. This empty file may help make the file encryption layer more seamless by creating a file stored by the operating system using the filename and/or path of the first open file call, while the actual data is stored in an encrypted form in a new encrypted file with a filename generated by the file encryption layer.

At 912, the technique 900 includes adding a new entry to a list of open encrypted files that includes the file descriptor for the new encrypted file and the encryption key. The file encryption layer may maintain this list of open encrypted files, which may be referred to as a cache of open encrypted files. For example, the list of open encrypted files may be encoded as an array of entries or as linked list of entries, among other possible encodings. In some implementations, the new entry in the list of open encrypted files is associated with a buffer configured to store plaintext data corresponding to a single block of encrypted data stored in the new encrypted file. In some implementations, the new encrypted file includes a header with fields that encode an identifier for a cryptography cipher suite and an encryption block size used in the new encrypted file. For example, the new encrypted file may include a header with the format described in relation to FIG. 8.

At 914, the technique 900 includes adding a new entry to the list of encrypted files that includes a filename and a path from the first open file call and the new filename.

At 916, the technique 900 includes returning an identifier for the new entry in the list of open encrypted files to the application in response to the first open file call. In some implementations, the identifier for the new entry in the list of open encrypted files is the file descriptor for the new encrypted file and the list of open encrypted files is indexed by file descriptors from the operating system. In some implementations, the identifier is an index to the list of open encrypted files and the identifier is different from the file descriptor for the new encrypted file.

Once the encrypted file has been opened, the technique 900 may include writing to the file with encryption of data passed in by a write file call intercepted from the application, reading from the file with decryption of the data before returning a plaintext version of the data to the application in response to read file call intercepted from the application, and/or closing the encrypted file. For example, the technique 900 may include implementation of the technique 1000 of FIG. 10. For example, the technique 900 may include implementation of the technique 1100 of FIG. 11. In some implementations, data from a write file call that is encrypted and stored in the encrypted file is data from a voicemail.

Figure 10:
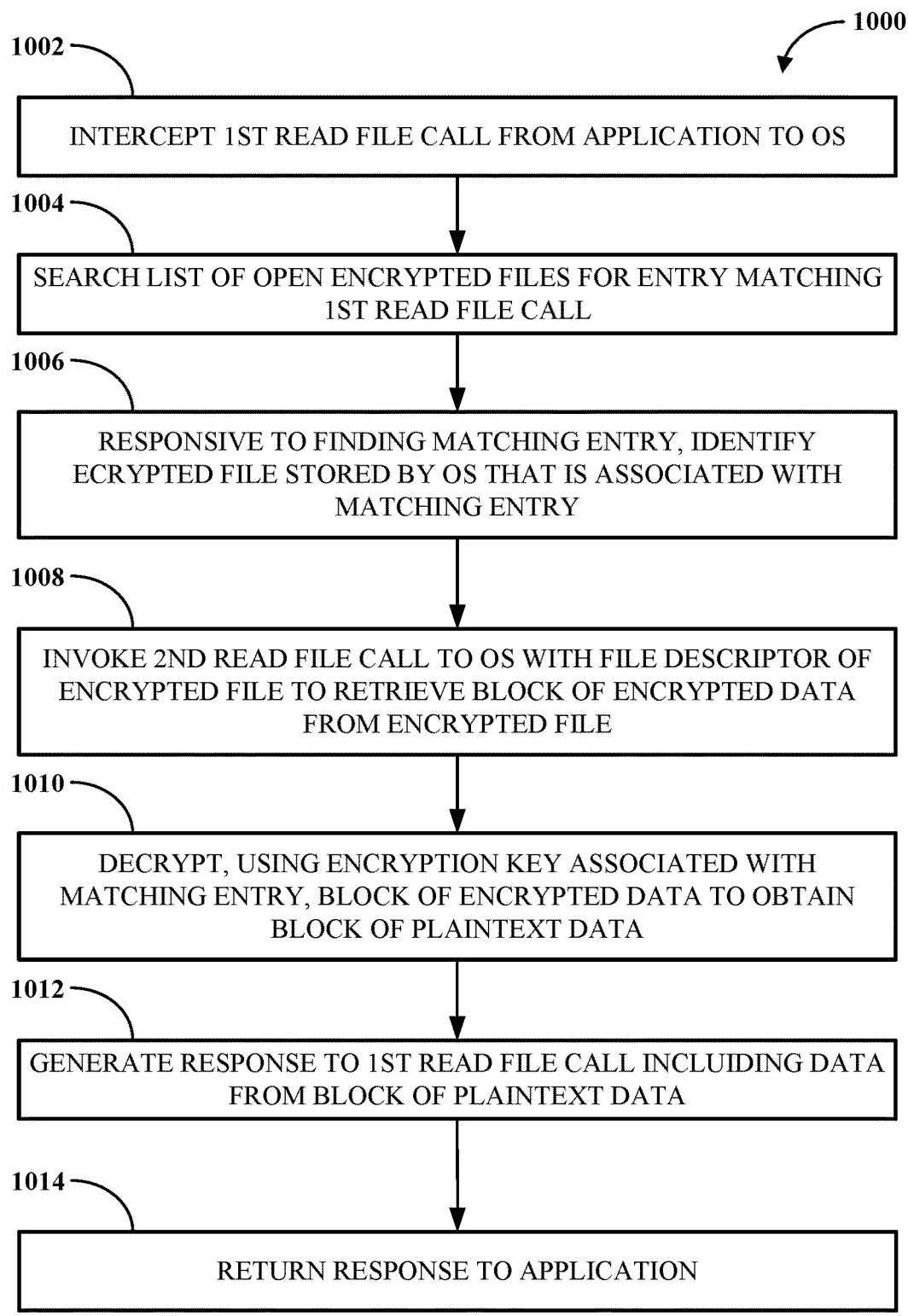
FIG. 10 is a flowchart of an example of a technique for reading from a file using a file encryption layer.

FIG. 10 is a flowchart of an example of a technique 1000 for reading from a file using a file encryption layer. The technique 1000 can be executed using computing devices, such as the systems, hardware, and software described with respect to FIGS. 1-5. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, the technique 1000 includes intercepting a first read file call from the application to the operating system. For example, intercepting the first read file call may include hooking the first read file call. For example, the technique 600 of FIG. 6 may be used to initialize a file encryption layer and set environment parameters to establish hooking of relevant system calls from the application.

At 1004, the technique 1000 includes searching the list of open encrypted files for an entry matching the first read file call. The file encryption layer may maintain a list of open encrypted files to which the file encryption layer controls access. The first read file call may include an identifier for an encrypted file to be read. The identifier may have been previously returned to the application in response to an open file call that caused the encrypted file to be opened. For example, the identifier may be a file descriptor (e.g., a file handle) for the encrypted file to be read. Entries in the list of open encrypted files may include a respective file descriptor and an encryption key to be used for encrypting and decrypting data flowing into and out of the associated encrypted file. The list of open encrypted files may be referred to as a cache of open encrypted files. For example, the list of open encrypted files may be encoded as an array of entries or as linked list of entries, among other possible encodings. In some implementations, an entry in the list of open encrypted files is associated with a buffer configured to store plaintext data corresponding to a single block of encrypted data stored in the encrypted file associated with the entry. The identifier from the first read file call may be compared to the identifiers of entries in the list of open encrypted files. If no match is found, then the first read file call may be invoked to the operating system to check if it is directed to a valid unencrypted file.

At 1006, the technique 1000 includes, responsive to finding a matching entry of the list of open encrypted files, identifying an encrypted file stored by the operating system that is associated with the matching entry. For example, the encrypted file may be identified by reading a file descriptor (e.g., a file handle) from the matching entry. In some implementations, the file descriptor was also the identifier from the first read file call that was used to search the list of open encrypted files. In some implementations, the file descriptor is different than the identifier from the first read file call that was used to search the list of open encrypted files, and the application does not directly access the file descriptor for the encrypted file.

At 1008, the technique 1000 includes invoking a second read file call to the operating system with a file descriptor of the encrypted file to retrieve a block of encrypted data from the encrypted file. For example, the block size of encrypted data stored in encrypted file may be encoded in a header (e.g., the header illustrated in FIG. 8) of the encrypted file. In some implementations, multiple blocks of encrypted data are read from the encrypted file at once by the file encryption layer. In some implementations, a single block of encrypted data is read from the encrypted file by the second read file call and additional read file calls may be used to retrieve additional blocks of the encrypted data as needed to complete a request for data corresponding to the first read file call from the application. For example, invoking the second read file call may include executing the second read file call.

At 1010, the technique 1000 includes decrypting, using an encryption key associated with the matching entry, the block of encrypted data to obtain a block of plaintext data. In some implementations, an encryption protocol to be used with the encryption key to decrypt the data is selected based on an encryption protocol identifier stored in the matching entry of the list of open encrypted files, which may have been loaded with data from a header (e.g., the header of FIG. 8) of the encrypted file when the encrypted file was opened. For example, the block of plaintext data may be stored in a temporary buffer or sandbox of the file encryption layer that is associated with the matching entry of the list of open encrypted files.

At 1012, the technique 1000 includes generating a response to the first read file call including data from the block of plaintext data. In some implementations, response may include plaintext data decrypted from multiple blocks of encrypted data retrieved from the encrypted file. In some implementations, response may include plaintext data that is a subset of plain text data decrypted from a single block of encrypted data retrieved from the encrypted file.

At 1014, the technique 1000 includes returning the response to the application.

Figure 11:
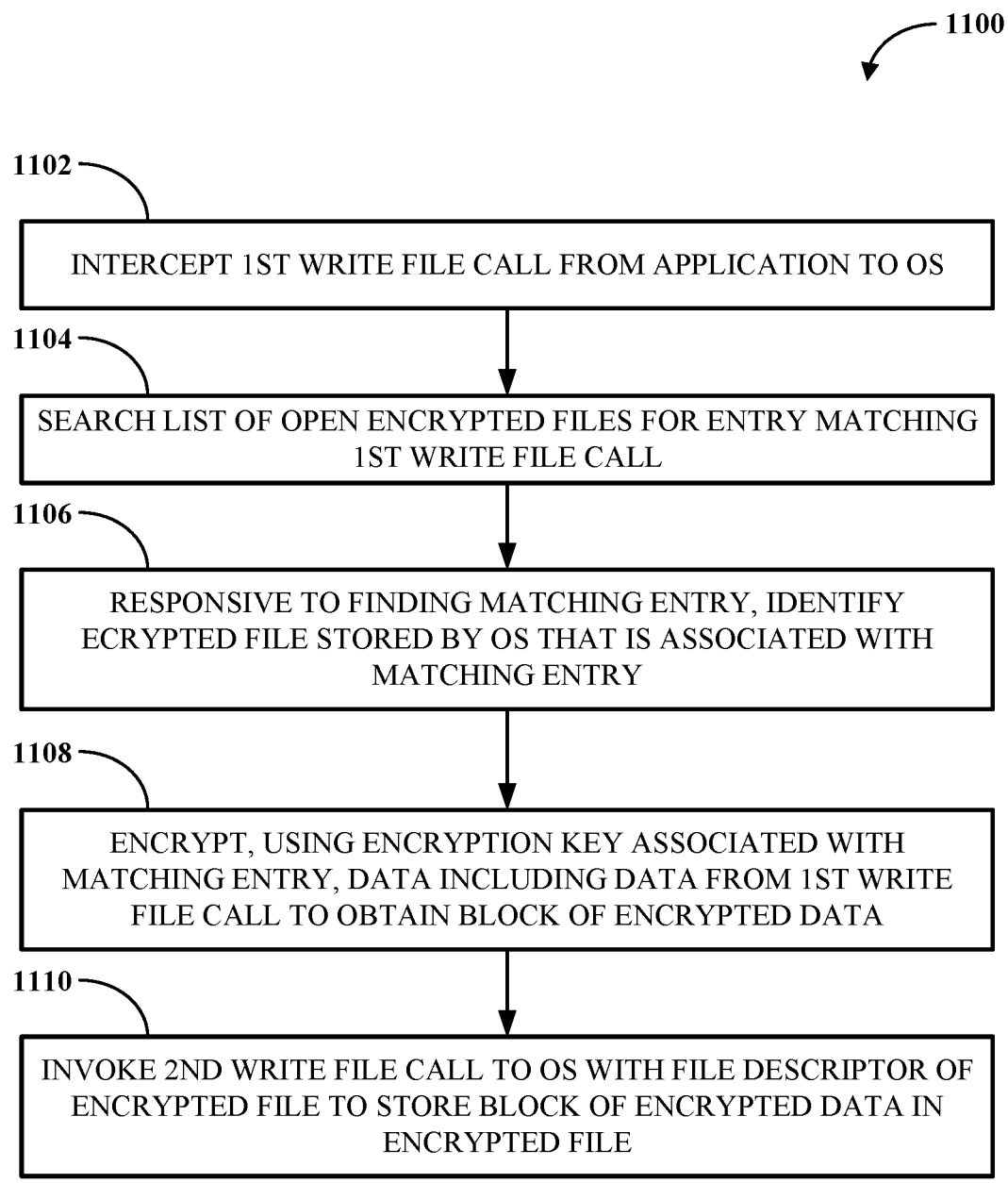
FIG. 11 is a flowchart of an example of a technique for writing to a file using a file encryption layer.

FIG. 11 is a flowchart of an example of a technique 1100 for writing to a file using a file encryption layer. The technique 1100 can be executed using computing devices, such as the systems, hardware, and software described with respect to FIGS. 1-5. The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof.

For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, the technique 1100 includes intercepting a first write file call from the application to the operating system. For example, intercepting the first write file call may include hooking the first write file call. For example, the technique 600 of FIG. 6 may be used to initialize a file encryption layer and set environment parameters to establish hooking of relevant system calls from the application.

At 1104, the technique 1100 includes searching a list of open encrypted files for an entry matching the first write file call. The file encryption layer may maintain a list of open encrypted files to which the file encryption layer controls access. The first write file call may include an identifier for an encrypted file to be written to. The identifier may have been previously returned to the application in response to an open file call that caused the encrypted file to be opened. For example, the identifier may be a file descriptor (e.g., a file handle) for the encrypted file to be written to. Entries in the list of open encrypted files may include a respective file descriptor and an encryption key to be used for encrypting and decrypting data flowing into and out of the associated encrypted file. The list of open encrypted files may be referred to as a cache of open encrypted files. For example, the list of open encrypted files may be encoded as an array of entries or as linked list of entries, among other possible encodings. In some implementations, an entry in the list of open encrypted files is associated with a buffer configured to store plaintext data corresponding to a single block of encrypted data stored in the encrypted file associated with the entry. The identifier from the first write file call may be compared to the identifiers of entries in the list of open encrypted files. If no match is found, then the first write file call may be invoked to the operating system to check if it is directed to a valid unencrypted file.

At 1106, the technique 1100 includes, responsive to finding a matching entry of the list of open encrypted files, identifying an encrypted file stored by the operating system that is associated with the matching entry. For example, the encrypted file may be identified by reading a file descriptor (e.g., a file handle) from the matching entry. In some implementations, the file descriptor was also the identifier from the first write file call that was used to search the list of open encrypted files. In some implementations, the file descriptor is different than the identifier from the first write file call that was used to search the list of open encrypted files, and the application does not directly access the file descriptor for the encrypted file.

At 1108, the technique 1100 includes encrypting, using an encryption key associated with the matching entry, data including data from the first write file call to obtain a block of encrypted data. In some implementations, the data from the first write file call that is encrypted is data from a voicemail. In an example, an encryption protocol to be used with the encryption key to encrypt the data is selected based on an encryption protocol identifier stored in the matching entry of the list of open encrypted files, which may have been loaded with data from a header (e.g., the header of FIG. 8) of the encrypted file when the encrypted file was opened. In some implementations, the data encrypted to obtain the block of encrypted data also includes plaintext data that was obtained by decrypting a block of encrypted data from the encrypted file. For example, the first write file call may cause a block of data corresponding to encryption block in the encrypted file to be decrypted, edited in plaintext form, and then re-encrypted for storage of the updated data in the encrypted file. In some implementations, a temporary buffer or sandbox associated with the matching entry may be checked to see of the plaintext version of the block of data from the encrypted file to be edited is already available (e.g., from processing a previous read file call or a previous write file call). If the plain text data to edited is unavailable, a read file call may be invoked to retrieve a needed block of encrypted data from the encrypted file. The retrieve encrypted data may be decrypted to obtain plaintext data that is stored in the temporary buffer or sandbox for editing based on the first write file call. Once the editing of plaintext data is complete, the resulting plaintext data may be encrypted to obtain the block of encrypted data.

At 1110, the technique 1100 includes invoking a second write file call to the operating system with a file descriptor of the encrypted file to store the block of encrypted data in the encrypted file. For example, the block size of encrypted data stored in encrypted file may be encoded in a header (e.g., the header illustrated in FIG. 8) of the encrypted file. In some implementations, multiple blocks of encrypted data are written to the encrypted file at once by the file encryption layer. In some implementations, a single block of encrypted data is written to the encrypted file by the second write file call and additional write file calls may be used to store additional blocks of the encrypted data as needed to complete a request corresponding to the first write file call from the application. For example, invoking the second write file call may include executing the second write file call.

One aspect of this disclosure is a method including intercepting a first open file call from an application to an operating system; searching a list of encrypted files for an entry matching the first open file call; responsive to not finding a matching entry of the list of encrypted files, generating a new filename and obtaining an encryption key; invoking a second open file call to the operating system to open a new encrypted file with the new filename and to obtain a file descriptor for the new encrypted file; adding a new entry to a list of open encrypted files that includes the file descriptor for the new encrypted file and the encryption key; adding a new entry to the list of encrypted files that includes a filename and a path from the first open file call and the new filename; and returning an identifier for the new entry in the list of open encrypted files to the application in response to the first open file call. In some implementations, the method includes invoking a third open file call to the operating system to open an empty file with the filename and the path from the first open file call. Intercepting the first open file call may include hooking the first open file call. In some implementations, the identifier for the new entry in the list of open encrypted files is the file descriptor for the new encrypted file and the list of open encrypted files is indexed by file descriptors from the operating system. In some implementations, the identifier is an index to the list of open encrypted files and the identifier is different from the file descriptor for the new encrypted file. In some implementations, the new entry in the list of open encrypted files is associated with a buffer configured to store plaintext data corresponding to a single block of encrypted data stored in the new encrypted file. In some implementations, the new encrypted file includes a header with fields that encode an identifier for a cryptography cipher suite and an encryption block size used in the new encrypted file. In some implementations, the method includes intercepting a first read file call from the application to the operating system; searching the list of open encrypted files for an entry matching the first read file call; responsive to finding a matching entry of the list of open encrypted files, identifying an encrypted file stored by the operating system that is associated with the matching entry; invoking a second read file call to the operating system with a file descriptor of the encrypted file to retrieve a block of encrypted data from the encrypted file; decrypting, using an encryption key associated with the matching entry, the block of encrypted data to obtain a block of plaintext data; generating a response to the first read file call including data from the block of plaintext data; and returning the response to the application. In some implementations, the method includes intercepting a first write file call from the application to the operating system; searching a list of open encrypted files for an entry matching the first write file call; responsive to finding a matching entry of the list of open encrypted files, identifying an encrypted file stored by the operating system that is associated with the matching entry; encrypting, using an encryption key associated with the matching entry, data including data from the first write file call to obtain a block of encrypted data; and invoking a second write file call to the operating system with a file descriptor of the encrypted file to store the block of encrypted data in the encrypted file. The data from the first write file call that is encrypted may be data from a voicemail. In some implementations, the new filename is generated randomly.

One aspect of this disclosure is a system including a processor and a memory, wherein the memory stores instructions executable by the processor to: intercept a first open file call from an application to an operating system; search a list of encrypted files for an entry matching the first open file call; responsive to not finding a matching entry of the list of encrypted files, generate a new filename and obtaining an encryption key; invoke a second open file call to the operating system to open a new encrypted file with the new filename and to obtain a file descriptor for the new encrypted file; add a new entry to a list of open encrypted files that includes the file descriptor for the new encrypted file and the encryption key; add a new entry to the list of encrypted files that includes a filename and a path from the first open file call and the new filename; and return an identifier for the new entry in the list of open encrypted files to the application in response to the first open file call. In some implementations, the memory stores instructions executable by the processor to invoke a third open file call to the operating system to open an empty file with the filename and the path from the first open file call. In some implementations, the identifier is an index to the list of open encrypted files and the identifier is different from the file descriptor for the new encrypted file. In some implementations, the new entry in the list of open encrypted files is associated with a buffer configured to store plaintext data corresponding to a single block of encrypted data stored in the new encrypted file. In some implementations, the new encrypted file includes a header with fields that encode an identifier for a cryptography cipher suite and an encryption block size used in the new encrypted file. In some implementations, the memory stores instructions executable by the processor to intercept a first read file call from the application to the operating system; search the list of open encrypted files for an entry matching the first read file call; responsive to finding a matching entry of the list of open encrypted files, identify an encrypted file stored by the operating system that is associated with the matching entry; invoke a second read file call to the operating system with a file descriptor of the encrypted file to retrieve a block of encrypted data from the encrypted file; decrypt, using an encryption key associated with the matching entry, the block of encrypted data to obtain a block of plaintext data; generate a response to the first read file call including data from the block of plaintext data; and return the response to the application. In some implementations, the memory stores instructions executable by the processor to intercept a first write file call from the application to the operating system; search a list of open encrypted files for an entry matching the first write file call; responsive to finding a matching entry of the list of open encrypted files, identify an encrypted file stored by the operating system that is associated with the matching entry; encrypt, using an encryption key associated with the matching entry, data including data from the first write file call to obtain a block of encrypted data; and invoke a second write file call to the operating system with a file descriptor of the encrypted file to store the block of encrypted data in the encrypted file. In some implementations, the new filename is generated randomly. Intercepting the first open file call may include hooking the first open file call. In some implementations, the identifier for the new entry in the list of open encrypted files is the file descriptor for the new encrypted file and the list of open encrypted files is indexed by file descriptors from the operating system. The data from the first write file call that is encrypted may be data from a voicemail.

One aspect of this disclosure is a non-transitory computer-readable storage medium, comprising executable instructions that, when executed by a processor, facilitate performance of operations, including intercepting a first open file call from an application to an operating system; searching a list of encrypted files for an entry matching the first open file call; responsive to not finding a matching entry of the list of encrypted files, generating a new filename and obtaining an encryption key; invoking a second open file call to the operating system to open a new encrypted file with the new filename and to obtain a file descriptor for the new encrypted file; adding a new entry to a list of open encrypted files that includes the file descriptor for the new encrypted file and the encryption key; adding a new entry to the list of encrypted files that includes a filename and a path from the first open file call and the new filename; and returning an identifier for the new entry in the list of open encrypted files to the application in response to the first open file call. In some implementations, the operations include invoking a third open file call to the operating system to open an empty file with the filename and the path from the first open file call. Intercepting the first open file call may include hooking the first open file call. In some implementations, the identifier for the new entry in the list of open encrypted files is the file descriptor for the new encrypted file and the list of open encrypted files is indexed by file descriptors from the operating system. In some implementations, the identifier is an index to the list of open encrypted files and the identifier is different from the file descriptor for the new encrypted file. In some implementations, the new entry in the list of open encrypted files is associated with a buffer configured to store plaintext data corresponding to a single block of encrypted data stored in the new encrypted file. In some implementations, the new encrypted file includes a header with fields that encode an identifier for a cryptography cipher suite and an encryption block size used in the new encrypted file. In some implementations, the operations include intercepting a first read file call from the application to the operating system; searching the list of open encrypted files for an entry matching the first read file call; responsive to finding a matching entry of the list of open encrypted files, identifying an encrypted file stored by the operating system that is associated with the matching entry; invoking a second read file call to the operating system with a file descriptor of the encrypted file to retrieve a block of encrypted data from the encrypted file; decrypting, using an encryption key associated with the matching entry, the block of encrypted data to obtain a block of plaintext data; generating a response to the first read file call including data from the block of plaintext data; and returning the response to the application. In some implementations, the operations include intercepting a first write file call from the application to the operating system; searching a list of open encrypted files for an entry matching the first write file call; responsive to finding a matching entry of the list of open encrypted files, identifying an encrypted file stored by the operating system that is associated with the matching entry; encrypting, using an encryption key associated with the matching entry, data including data from the first write file call to obtain a block of encrypted data; and invoking a second write file call to the operating system with a file descriptor of the encrypted file to store the block of encrypted data in the encrypted file. The data from the first write file call that is encrypted may be data from a voicemail. In some implementations, the new filename is generated randomly.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    intercepting a first open file call from an application to an operating system;
    searching a list of encrypted files for an entry matching the first open file call;
    responsive to not finding a matching entry of the list of encrypted files, generating a new filename and obtaining an encryption key;
    invoking a second open file call to the operating system to open a new encrypted file with the new filename and to obtain a file descriptor for the new encrypted file;
    adding a new entry to a list of open encrypted files that includes the file descriptor for the new encrypted file and the encryption key;
    adding a new entry to the list of encrypted files that includes a filename and a path from the first open file call and the new filename;
    returning an identifier for the new entry in the list of open encrypted files to the application in response to the first open file call;
    intercepting a first read file call from the application to the operating system;
    searching the list of open encrypted files for an entry matching the first read file call;
    responsive to finding a matching entry of the list of open encrypted files, identifying an encrypted file stored by the operating system that is associated with the matching entry;
    invoking a second read file call to the operating system with a file descriptor of the encrypted file to retrieve a block of encrypted data from the encrypted file;
    decrypting, using an encryption key associated with the matching entry, the block of encrypted data to obtain a block of plaintext data;
    generating a response to the first read file call including data from the block of plaintext data; and
    returning the response to the application.

2. The method of claim 1, comprising:
    invoking a third open file call to the operating system to open an empty file with the filename and the path from the first open file call.

3. The method of claim 1, wherein intercepting the first open file call comprises:
    hooking the first open file call.

4. The method of claim 1, wherein the identifier for the new entry in the list of open encrypted files is the file descriptor for the new encrypted file and the list of open encrypted files is indexed by file descriptors from the operating system.

5. The method of claim 1, wherein the identifier is an index to the list of open encrypted files and the identifier is different from the file descriptor for the new encrypted file.

6. The method of claim 1, wherein the new entry in the list of open encrypted files is associated with a buffer configured to store plaintext data corresponding to a single block of encrypted data stored in the new encrypted file.

7. The method of claim 1, wherein the new encrypted file includes a header with fields that encode an identifier for a cryptography cipher suite and an encryption block size used in the new encrypted file.

8. The method of claim 1, comprising:
    intercepting a first write file call from the application to the operating system;
    searching a list of open encrypted files for an entry matching the first write file call;
    responsive to finding a matching entry of the list of open encrypted files, identifying an encrypted file stored by the operating system that is associated with the matching entry;
    encrypting, using an encryption key associated with the matching entry, data including data from the first write file call to obtain a block of encrypted data; and
    invoking a second write file call to the operating system with a file descriptor of the encrypted file to store the block of encrypted data in the encrypted file.

9. The method of claim 8, wherein the data from the first write file call that is encrypted is data from a voicemail.

10. The method of claim 1, wherein the new filename is generated randomly.

11. A system comprising:
    a processor, and
    a memory, wherein the memory stores instructions executable by the processor to:
        intercept a first open file call from an application to an operating system;
        search a list of encrypted files for an entry matching the first open file call;
        responsive to not finding a matching entry of the list of encrypted files, generate a new filename and obtaining an encryption key;
        invoke a second open file call to the operating system to open a new encrypted file with the new filename and to obtain a file descriptor for the new encrypted file;
        add a new entry to a list of open encrypted files that includes the file descriptor for the new encrypted file and the encryption key;
        add a new entry to the list of encrypted files that includes a filename and a path from the first open file call and the new filename;
        return an identifier for the new entry in the list of open encrypted files to the application in response to the first open file call;

intercept a first read file call from the application to the operating system;

search the list of open encrypted files for an entry matching the first read file call;

responsive to finding a matching entry of the list of open encrypted files, identify an encrypted file stored by the operating system that is associated with the matching entry;

invoke a second read file call to the operating system with a file descriptor of the encrypted file to retrieve a block of encrypted data from the encrypted file;

decrypt, using an encryption key associated with the matching entry, the block of encrypted data to obtain a block of plaintext data;

generate a response to the first read file call including data from the block of plaintext data; and return the response to the application.

12. The system of claim 11, wherein the memory stores instructions executable by the processor to:

invoke a third open file call to the operating system to open an empty file with the filename and the path from the first open file call.

13. The system of claim 11, wherein the identifier is an index to the list of open encrypted files and the identifier is different from the file descriptor for the new encrypted file.

14. The system of claim 11, wherein the new entry in the list of open encrypted files is associated with a buffer configured to store plaintext data corresponding to a single block of encrypted data stored in the new encrypted file.

15. The system of claim 11, wherein the new encrypted file includes a header with fields that encode an identifier for a cryptography cipher suite and an encryption block size used in the new encrypted file.

16. The system of claim 11, wherein the memory stores instructions executable by the processor to:

intercept a first write file call from the application to the operating system;

search a list of open encrypted files for an entry matching the first write file call;

responsive to finding a matching entry of the list of open encrypted files, identify an encrypted file stored by the operating system that is associated with the matching entry;

encrypt, using an encryption key associated with the matching entry, data including data from the first write file call to obtain a block of encrypted data; and invoke a second write file call to the operating system with a file descriptor of the encrypted file to store the block of encrypted data in the encrypted file.

17. The system of claim 11, wherein the new filename is generated randomly.

18. A non-transitory computer-readable storage medium, comprising executable instructions that, when executed by a processor, facilitate performance of operations, comprising:

intercepting a first open file call from an application to an operating system;

searching a list of encrypted files for an entry matching the first open file call;

responsive to not finding a matching entry of the list of encrypted files, generating a new filename and obtaining an encryption key;

invoking a second open file call to the operating system to open a new encrypted file with the new filename and to obtain a file descriptor for the new encrypted file;

adding a new entry to a list of open encrypted files that includes the file descriptor for the new encrypted file and the encryption key;

adding a new entry to the list of encrypted files that includes a filename and a path from the first open file call and the new filename;

returning an identifier for the new entry in the list of open encrypted files to the application in response to the first open file call;

intercepting a first read file call from the application to the operating system;

searching the list of open encrypted files for an entry matching the first read file call;

responsive to finding a matching entry of the list of open encrypted files, identifying an encrypted file stored by the operating system that is associated with the matching entry;

invoking a second read file call to the operating system with a file descriptor of the encrypted file to retrieve a block of encrypted data from the encrypted file;

decrypting, using an encryption key associated with the matching entry, the block of encrypted data to obtain a block of plaintext data;

generating a response to the first read file call including data from the block of plaintext data; and returning the response to the application.

19. The non-transitory computer-readable storage medium of claim 18, comprising executable instructions that, when executed by a processor, facilitate performance of operations, comprising:

invoking a third open file call to the operating system to open an empty file with the filename and the path from the first open file call.

20. The non-transitory computer-readable storage medium of claim 18, wherein the new entry in the list of open encrypted files is associated with a buffer configured to store plaintext data corresponding to a single block of encrypted data stored in the new encrypted file.

* * * * *